United States Patent
Coney

(10) Patent No.: US 8,726,629 B2
(45) Date of Patent: May 20, 2014

(54) COMPRESSED AIR ENERGY SYSTEM INTEGRATED WITH GAS TURBINE

(71) Applicant: LightSail Energy, Inc., Berkeley, CA (US)

(72) Inventor: Michael Coney, Swindon (GB)

(73) Assignee: Lightsail Energy, Inc., Berkeley, CA (US)

( * ) Notice: Subject to any disclaimer, the term of this patent is extended or adjusted under 35 U.S.C. 154(b) by 0 days.

(21) Appl. No.: 13/645,327

(22) Filed: Oct. 4, 2012

(65) Prior Publication Data

US 2014/0096504 A1  Apr. 10, 2014

(51) Int. Cl.
  *F02C 7/10* (2006.01)
  *F02C 6/16* (2006.01)

(52) U.S. Cl.
  USPC ............. 60/39.511; 60/39.5; 60/726; 60/791

(58) Field of Classification Search
  USPC ............. 60/39.511, 39.15, 791, 792, 39.163, 60/39.17, 39.181, 39.5, 726–728
  See application file for complete search history.

(56) References Cited

U.S. PATENT DOCUMENTS

| | | | |
|---|---|---|---|
| 1,751,537 A | | 3/1930 | Vianello |
| 1,929,350 A | | 10/1933 | Christensen |
| 3,166,902 A | * | 1/1965 | Meyer et al. ............... 60/792 |
| 3,585,795 A | * | 6/1971 | Grieb .................. 60/39.163 |
| 3,797,237 A | | 3/1974 | Kamiya |
| 4,060,337 A | | 11/1977 | Bell, III |
| 4,100,745 A | | 7/1978 | Gyarmathy et al. |
| 4,347,706 A | | 9/1982 | Drost |
| 4,393,653 A | | 7/1983 | Fischer |
| 4,426,847 A | | 1/1984 | Fischer |
| 4,432,203 A | | 2/1984 | Fischer |
| 4,476,821 A | | 10/1984 | Robinson et al. |
| 4,747,271 A | | 5/1988 | Fischer |
| 4,829,763 A | | 5/1989 | Rao |

(Continued)

FOREIGN PATENT DOCUMENTS

| JP | 56-132477 A | 10/1981 |
|---|---|---|
| JP | 9-166028 A | 6/1997 |

(Continued)

OTHER PUBLICATIONS

Farmer, Robert et al., "2012 GTW Handbook", Gas Turbine World, 2012, pp. 3, 10, 48, 79, vol. 29, Prquot Publishing Inc., Fairfield CT, US.

(Continued)

*Primary Examiner* — Andrew Nguyen

(57) ABSTRACT

An apparatus performs a power cycle involving expansion of compressed air utilizing high pressure (HP) and low pressure (LP) air turbines located upstream of a gas turbine. The power cycle involves heating of the compressed air prior to its expansion in the HP and LP air turbines. Taking into consideration fuel consumption to heat the compressed air, particular embodiments may result in a net production of electrical energy of ~2.2-2.5× an amount of energy consumed by substantially isothermal air compression to produce the compressed air supply. Although pressure of the compressed air supply may vary over a range (e.g. as a compressed air storage unit is depleted), the gas turbine may run under almost constant conditions, facilitating its integration with the apparatus. The air turbines may operate at lower temperatures than the gas turbine, and they may include features of turbines employed to turbocharge large reciprocating engines.

12 Claims, 9 Drawing Sheets

(56) References Cited

U.S. PATENT DOCUMENTS

| | | | |
|---|---|---|---|
| 4,893,466 A * | 1/1990 | Egnell et al. | 60/773 |
| 4,922,709 A | 5/1990 | Hendriks | |
| 5,076,067 A | 12/1991 | Prenger et al. | |
| 5,165,239 A | 11/1992 | Bechtel et al. | |
| 5,195,874 A | 3/1993 | Odagiri | |
| 5,311,739 A | 5/1994 | Clark | |
| 5,313,782 A * | 5/1994 | Frutschi et al. | 60/39.17 |
| 5,386,688 A | 2/1995 | Nakhamkin | |
| 5,491,969 A | 2/1996 | Cohn et al. | |
| 5,537,822 A | 7/1996 | Shnaid et al. | |
| 5,634,340 A | 6/1997 | Grennan | |
| 5,778,675 A | 7/1998 | Nakhamkin | |
| 5,934,065 A * | 8/1999 | Bronicki et al. | 60/39.181 |
| 5,934,076 A | 8/1999 | Coney | |
| 6,141,953 A * | 11/2000 | Mongia et al. | 60/774 |
| 6,199,363 B1 * | 3/2001 | Frutschi | 60/775 |
| 6,206,660 B1 | 3/2001 | Coney et al. | |
| RE37,603 E | 3/2002 | Coney | |
| 6,351,935 B1 * | 3/2002 | Bronicki et al. | 60/39.182 |
| 6,745,569 B2 | 6/2004 | Gerdes | |
| 6,817,185 B2 | 11/2004 | Coney et al. | |
| 6,840,309 B2 | 1/2005 | Wilson et al. | |
| 6,874,453 B2 | 4/2005 | Coney et al. | |
| 6,883,775 B2 | 4/2005 | Coney et al. | |
| 7,150,154 B2 | 12/2006 | Althaus et al. | |
| 7,254,951 B2 * | 8/2007 | Lockwood, Jr. | 60/774 |
| 7,269,956 B2 | 9/2007 | Gericke et al. | |
| 7,389,644 B1 | 6/2008 | Nakhamkin | |
| 7,406,828 B1 | 8/2008 | Nakhamkin | |
| 7,614,237 B2 | 11/2009 | Nakhamkin | |
| 7,661,268 B2 | 2/2010 | Althaus et al. | |
| 7,770,376 B1 * | 8/2010 | Brostmeyer | 60/39.182 |
| 7,802,426 B2 | 9/2010 | Bollinger | |
| 7,832,207 B2 | 11/2010 | McBride et al. | |
| 7,833,126 B2 * | 11/2010 | Venter | 477/39 |
| 7,874,155 B2 | 1/2011 | McBride et al. | |
| 7,954,330 B2 | 6/2011 | Althaus | |
| 7,958,731 B2 | 6/2011 | McBride et al. | |
| 8,117,842 B2 | 2/2012 | McBride et al. | |
| 2002/0194832 A1 | 12/2002 | Smith | |
| 2003/0180155 A1 | 9/2003 | Coney et al. | |
| 2004/0244580 A1 | 12/2004 | Coney et al. | |
| 2005/0121532 A1 * | 6/2005 | Reale et al. | 237/12.1 |
| 2005/0235625 A1 | 10/2005 | Gericke et al. | |
| 2005/0279296 A1 | 12/2005 | Coney et al. | |
| 2006/0207094 A1 * | 9/2006 | Allen et al. | 29/889.1 |
| 2007/0044478 A1 | 3/2007 | Kashmerick | |
| 2007/0095069 A1 | 5/2007 | Joshi et al. | |
| 2008/0006032 A1 | 1/2008 | Robinson | |
| 2008/0044296 A1 | 2/2008 | Wood et al. | |
| 2008/0163618 A1 | 7/2008 | Paul | |
| 2009/0114195 A1 | 5/2009 | Hall et al. | |
| 2009/0211252 A1 | 8/2009 | Tani et al. | |
| 2010/0059005 A1 | 3/2010 | Stone et al. | |
| 2010/0089063 A1 | 4/2010 | McBride et al. | |
| 2010/0229544 A1 | 9/2010 | Bollinger et al. | |
| 2010/0307156 A1 | 12/2010 | Bollinger et al. | |
| 2011/0056368 A1 | 3/2011 | McBride et al. | |
| 2011/0094212 A1 | 4/2011 | Ast et al. | |
| 2011/0094231 A1 | 4/2011 | Freund | |
| 2011/0094236 A1 * | 4/2011 | Finkenrath et al. | 60/772 |
| 2011/0100010 A1 | 5/2011 | Freund et al. | |
| 2011/0115223 A1 | 5/2011 | Stahlkopf et al. | |
| 2011/0131966 A1 | 6/2011 | McBride et al. | |
| 2013/0074949 A1 | 3/2013 | McBride et al. | |

FOREIGN PATENT DOCUMENTS

| | | |
|---|---|---|
| JP | 2007-502389 A | 2/2007 |
| WO | WO 01/75290 A1 | 10/2001 |
| WO | WO 03/021702 A1 | 3/2003 |
| WO | WO 2008/139267 A1 | 11/2008 |
| WO | WO 2009/034421 A1 | 3/2009 |
| WO | WO 2009/034548 A2 | 3/2009 |
| WO | WO 2013/043754 A1 | 3/2013 |

OTHER PUBLICATIONS

Farmer, Robert et al., "New Solutions for Energy Storage and Smart Grid Load Management", Gas Turbine World, Apr. 2009, pp. 22-26, vol. 39, No. 2, Pequot Publishing Inc., Fairfield CT, US.

Igoe, Brian et al., "Improvements in power, efficiency and environmental benefits equip the SGT-100 gas turbine for the increased demands of distributed generation", Apr. 2010, pp. 1-15.

Nakhamkin, M. et al., "Second Generation of CAES Technology—Performance, Operations, Economics, Renewable Load Management, Green Energy", Dec. 10, 2009, pp. 1-12.

Neuenschwander, Peter et al., "New turbochargers for more powerful engines running under stricter emissions regimes", International Council on Combustion Engines, 2010, pp. 1-12, Paper No. 128, CIMAC Congress, Bergen.

Solar Turbines, "Taurus 70, Gas Turbine Generator Set", 2012, pp. 1-2, Solar Turbines Incorporated, San Diego CA, US.

Tanimura, Kazuhiko et al., "Development of an 8MW-Class High-Efficiency Gas Turbine, M7A-03", Proceedings of GT2007, ASME Turbo Expo, May 17, 2007, pp. 1-9, ASME.

Michael W. Coney et al., "Development of a Reciprocating Compressor Using Water Injection to Achieve Quasi-Isothermal Compression", Presented at the International Compressor Engineering Conference at Purdue, Jul. 16-19, 2002, pp. 1-8.

Victor De Biasi, "New solutions for energy storage and smart grid load management", Gas Turbine World, Mar.-Apr. 2009, pp. 22-26, vol. 39 No. 2, Pequot Publishing, Inc, Fairfield, CT, USA.

Victor De Biasi, "Air injected power augmentation validated by Fr7FA peaker tests", Gas Turbine World, Mar.-Apr. 2002, pp. 12-15, Pequot Publishing, Inc, Fairfield, CT, USA.

International Search Report for PCT/US2012/056155, filed on Sep. 19, 2012.

U.S. Appl. No. 13/645,327, filed Oct. 4, 2012.

U.S. Appl. No. 14/037,217, filed Sep. 25, 2013.

Coney, Michael et al., "First Prototype of the High-Efficiency Isoengine", Institution of Diesel and Gas Turbine Engineers (IDGTE), Nov. 20, 2003, pp. 1-13, London.

Takahashi, Motoyuki et al., "Study of Exhaust Gas Separation (EGS) System on 2-stroke Engine", International Council on Combustion Engines (CIMAC) Congress, 2010, pp. 1-12, Paper No. 108, CIMAC Congress, Bergen.

Jolly, David, "Compressing Gas for a Cheaper, Simpler Hybrid", The New York Times, Mar. 1, 2013, pp. 1-6, The New York Times Company, US.

Woschni, G., "A Universally Applicable Equation for the Instantaneous Heat Transfer Coefficient in the Internal Combustion Engine", Society of Automotive Engineers, Feb. 1, 1967, pp. 1-13.

Woschni, Gerhard et al., "The Influence of Soot Deposits on Combustion Chamber Walls on Heat Losses in Diesel Engines", Society of Automotive Engineers, 1991, pp. 1-8.

Patton, Kenneth J. et al., "Development and Evaluation of a Friction Model for Spark-Ignition Engines", International Congress and Exposition, Feb. 27, 1989, pp. 1-21, Detroit, Michigan, USA.

Sandoval, Daniel et al., "An Improved Friction Model for Spark-Ignition Engines", SAE 2003 World Congress & Exhibition, 2003, pp. 1-12.

Office Action for U.S. Appl. No. 13/645,327 dated Jan. 29, 2013.

International Search Report and Written Opinion for PCT/US2013/061759, filed on Sep. 25, 2013.

International Search Report and Written Opinion for PCT/US2013/061759, filed Sep. 25, 2013.

* cited by examiner

COMPRESSED AIR ENERGY SYSTEM INTEGRATED WITH GAS TURBINE

BACKGROUND

Compressed air energy storage during off-peak periods can efficiently utilize surplus power from renewable and other sources. During periods of peak demand, heat may be applied to the compressed air to generate much more electrical energy than was originally stored. Compressed air energy storage avoids issues associated with battery storage such as limited lifetime, materials availability, or environmental friendliness.

SUMMARY

An apparatus performs a power cycle involving expansion of compressed air utilizing high pressure (HP) and low pressure (LP) air turbines located upstream of a gas turbine, which may be modified by removal of the gas turbine compressor. The power cycle involves heating of the compressed air prior to its expansion in the HP and LP air turbines. Taking into consideration fuel consumption to heat the compressed air, particular embodiments may result in a net production of electrical energy of ~2.2-2.5× an amount of energy consumed by substantially isothermal air compression to produce the compressed air supply. Although pressure of the compressed air supply may vary over a range (e.g. as a compressed air storage unit is depleted), the gas turbine may run under almost constant conditions, facilitating its integration with the apparatus. The air turbines may operate at lower temperatures than the gas turbine, and may include features of turbines employed to turbocharge large reciprocating engines.

DETAILED DESCRIPTION

Figure 1:
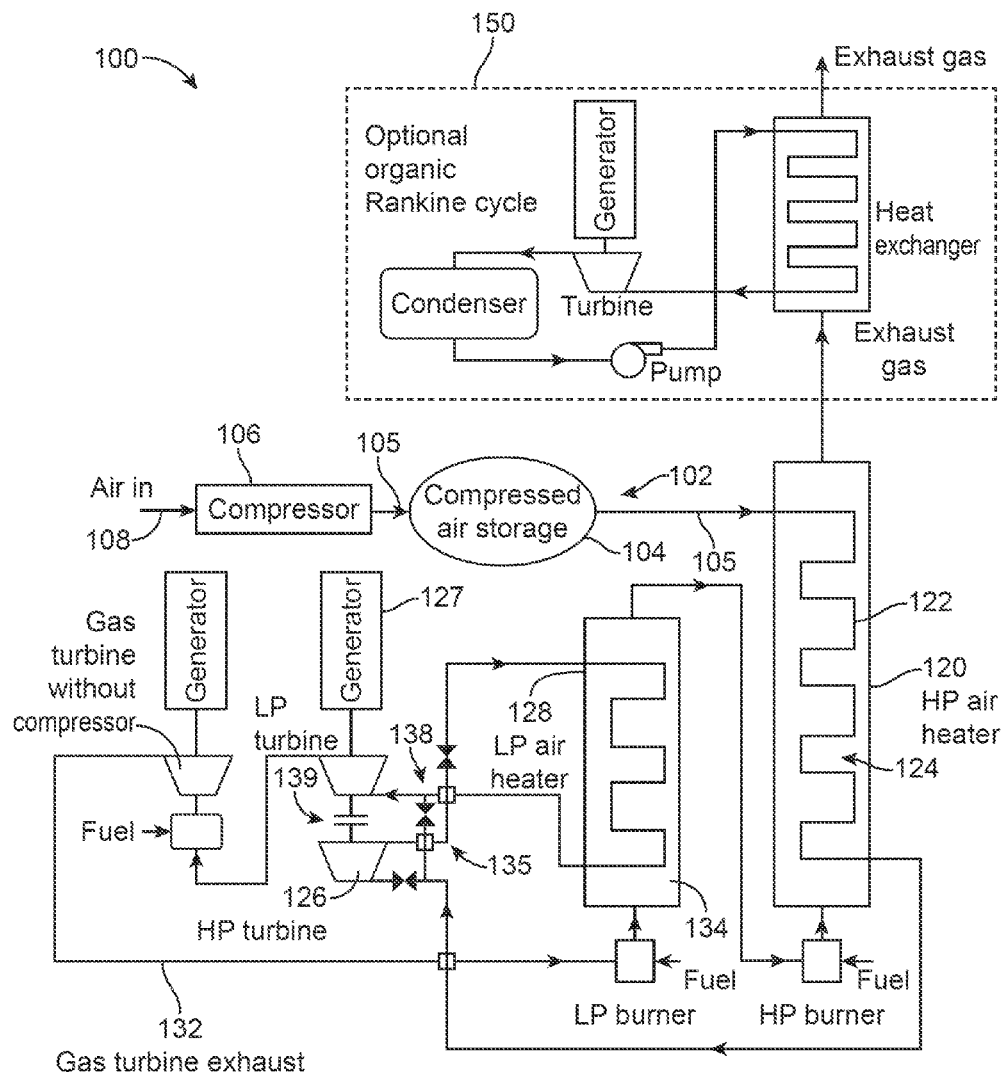
FIG. 1 shows a simplified diagram of a compressed air energy system according to an embodiment.

FIG. 1 shows a simplified diagram of a compressed air energy system according to an embodiment. System 100 comprises a source of compressed air 102, which in this particular embodiment comprises a compressed air storage unit 104. However, the presence of a compressed air storage unit is not required in all embodiments, and alternative embodiments could feature an air compressor or other source of compressed air.

Compressed air 105 is flowed into the compressed air storage unit from air compressor 106. In some embodiments, the air compressor may comprise a multi-stage compressor with intercooling between stages.

According to certain embodiments, air compressor 106 may function to compress inlet air 108 in a substantially isothermal manner for example utilizing heat exchange across a gas/liquid interface having a high surface area. Examples of such substantially isothermal compression (as well as substantially isothermal expansion) are described in U.S. Patent Publication No. 2011/0115223 ("the Publication"), which is hereby incorporated by reference in its entirety. It should be appreciated that certain of the designs discussed below may include one or more concepts discussed in the Publication.

Specifically, FIG. 1 shows the compressed air being fed to the inlet of a high pressure (HP) air heater 120. This HP air heater may be of tubular design, with high pressure air present inside the tubes 122, and low pressure exhaust gas being present within the space 124 enclosing the tubes. In particular embodiments, the HP air heater heats the incoming compressed air to about 700° C.

The hot compressed air then enters the HP air turbine 126. Therein, the hot compressed air may be expanded with a variable pressure ratio. In certain embodiments this variable pressure ratio may be up to 2.5 or even larger, depending on the pressure in the compressed air energy store. Expansion of the gas serves to drive first generator 127 to produce electricity.

Next, the partially expanded compressed air enters the low pressure (LP) air heater 128, where it is reheated before entering the inlet of the LP air turbine. According to some embodiments, the partially expanded compressed air may be reheated to the same temperature (e.g. 700° C. in particular embodiments).

The hot, partially expanded compressed air then enters the LP air turbine 130. Therein, the hot air may again be expanded to drive the first generator to produce even more electricity.

Design for the HP and/or LP air turbines may be inspired in part by turbines employed to turbocharge large reciprocating engines. Specifically, the HP and LP air turbines may also be equipped with variable nozzle geometry, providing greater flexibility to deal with large variations in flow rate and inlet pressure. Moreover, unlike the engine turbochargers which have to cope with dirty engine exhaust gases, the HP and LP air turbines proposed herein could run with clean air, further simplifying their design and operation.

Figure 2:
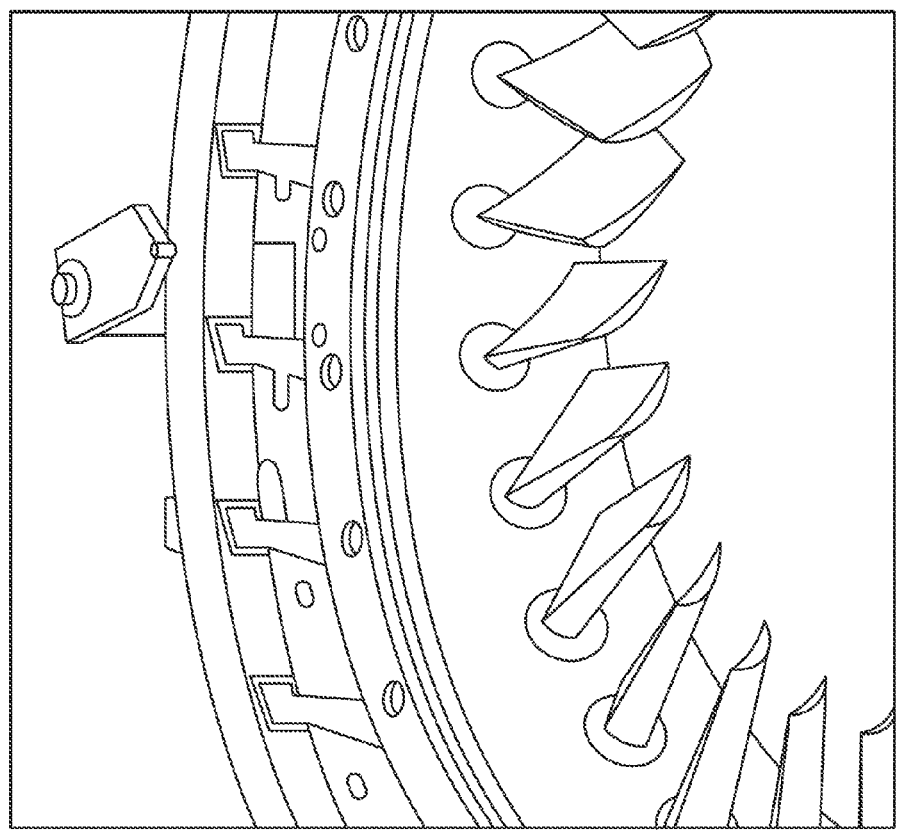
FIG. 2 shows a photograph of a turbine used as a turbocharger.

FIG. 2 shows a variable nozzle ring for a turbocharger manufactured by the ABB Group of Zurich, Switzerland. It can be seen from FIG. 2 that the nozzle vanes can be rotated to achieve the optimum incidence angle of the engine exhaust gas on the moving blades of the turbine. Also, the mechanism to achieve the adjustment of the nozzle vanes is located outside the casing containing the gas flow path, where the temperature is lower.

In certain embodiments it may be possible to rotate the so-called stationary vanes or nozzles through any angle relative to the flow direction, limited only by the interference between adjacent vanes. The mechanism for rotating the blades is outside the casing of the turbine and can be kept cool.

The rotation may be performed slowly in order to adjust to the new conditions. Hence these vanes may be effectively considered to be stationary.

However, the blades attached to the turbine shaft are at a fixed angle relative to the flow direction. These blades rotate at high speed.

A study of the aerodynamics may determine optimum arrangements with the flexibility to deal with the range of conditions expected. In certain embodiments, the HP turbine may comprise a single stage of adjustable stationary vanes, and its associated rotor comprising blades with a fixed flow angle.

By contrast, in certain embodiments the LP turbine may need to cope with a pressure ratio of six. The LP turbine may have two stages, with two rows of adjustable stationary vanes alternating with two rows of rotating blades of fixed angle.

In various embodiments the compressed air may be configured to exit the LP turbine at a pressure and temperature corresponding to the normal inlet conditions of the gas turbine combustor. This facilitates integration of the instant apparatus with an existing gas turbine without its compressor.

To achieve this compatibility, the LP turbine may also exhibit a variable pressure ratio. In particular embodiments, this pressure ratio may vary between about 2.5-6.

Some of the compressed air supplied to the gas turbine may not be used for combustion. Instead, the compressed air may be used for internal cooling of the stationary and moving blades of the gas turbine.

In order to retain the original cooling performance of the existing gas turbine, the temperature of the supplied compressed air may not exceed that which would have been provided from the compressor element of the gas turbine.

It is noted that under certain circumstances, the avoidance of a compressor element may reduce the cost of the gas turbine. And, where the gas turbine is of a single shaft design, it may be possible to remove the gas turbine compressor blades from the shaft and use the existing gas turbine combustor and turbine rotor.

It is further noted that in some embodiments, the application of the gas turbines to the present cycle may call for a modest increase in back pressure. However this adjustment is similar to that encountered when a heat recovery steam generator is added into a conventional combined cycle system.

After performing the required cooling on the initial blade row(s) of the gas turbine, the portion of the compressed air used for turbine blade cooling, passes out of small holes in the turbine blades and mixes with the main combustion gas flow through the downstream blade rows.

After leaving the gas turbine, the hot exhaust combustion gas 132 flows to the LP burner. Additional fuel is added to raise the exhaust gas temperature in order to heat the compressed air in the LP heater. For example, the exhaust gas temperature of the LP air heater may be raised to 720° C., where the compressed gas carried by the tubes is being reheated to 700° C.

After leaving the LP heater, the combustion gases are reheated (e.g. to 720° C.) once more in the HP burner. The heated combustion gases are then flowed to the enclosed space of the HP heater in order to heat the compressed air that is flowing through the tubes therein.

It is noted that in this particular embodiment, both the LP and HP burners are duct burners. In such duct burners, additional fuel is burned in the low pressure environment (e.g. the low pressure exhaust gas of the gas turbine). As duct burners are established technology, the expense and complexity of developing fuel combustion at high pressures can be avoided.

As previously noted, in this embodiment the compressed air is supplied from a compressed air storage unit. As the supply of compressed air is depleted in the unit, the pressure of the compressed gas may drop.

When the pressure of the stored compressed air drops below a certain amount (e.g. 100 bar), it may no longer be appropriate to have both the high and low pressure air turbines in operation. Under these conditions, the apparatus may be configured to route the heated high pressure air to the LP turbine, bypassing the HP air turbine. This selective routing of the compressed gas may be accomplished, for example, by the use of valving 135.

Since additional heat would not be added by the LP burner when the HP turbine is bypassed, it is not necessary for the air to go through the LP heater tubes. To minimize pressure drop and heat losses, it may be desirable for the compressed air (below 100 bar) to bypass the LP heater tubes as well as the HP turbine, and flow directly from the outlet of the HP heater to the LP air turbine. In certain embodiments this may be accomplished via multi-way valving scheme 138.

FIG. 1 shows only particular embodiment, and others are possible. For example, there are several ways of configuring valves or other flow-switching devices in order to make the transition from two air turbines, two burners, and two air heaters, to a single air turbine, burner, and air heater.

Thus alternative embodiments offer the choice of diverting not only the high pressure compressed air, but also the low pressure exhaust gas. The HP burner and HP air heater could be bypassed, and all the flow occurring through the LP burner and air heater.

Ultimately, the specific design employed in particular embodiments could represent a balance of factors. For example, a design could represent a compromise between the cost and complexity of the valve arrangement, versus minimization of the pressure drop in both the compressed air and in the combustion gas.

FIG. 1 indicates a mechanism 139 allowing the HP air turbine to be de-coupled from the air turbine shaft. Again, this may be desirable in operation modes where the compressed gas is provided at low pressure and bypasses the HP air turbine.

At the conclusion of the power cycle, the exhaust combustion gas is outlet from the enclosed space of the HP air heater. It is noted that the heat capacity of the combustion gases in the LP heater and the HP heater, is higher than that of the incoming compressed air. Thus, the temperature difference between the combustion gas and the compressed air can widen from the 20° C. difference that may occur at the outlets of the LP and HP burners.

One possible result of this widening in temperature difference is that the exhaust combustion gas temperature at the outlet of the HP heater may increase, for example to about 200° C. or more. In certain embodiments, the energy represented by this heat can be recovered and converted to electric power utilizing a simple organic Rankine cycle.

An organic Rankine cycle (ORC) is used for low temperature applications such as power generation from geothermal water, and heat recovery from industrial waste heat and from biomass-fired combined heat and power plants. The organic fluid is usually a hydrocarbon or a refrigerant.

Organic fluids have a lower boiling point than water. In addition, organic fluids have a lower latent heat relative to their specific heat. As a result, organic fluids may be more suitable than water for extracting sensible heat at moderate temperatures (e.g. less than about 300° C.) from a waste gas or liquid, in which the temperature falls as the heat is extracted.

Accordingly, organic Rankine cycles are usually much simpler than steam Rankine cycles. Organic Rankine cycles do not need multiple feed-heating stages or multiple boiler pressures. Neither do ORCs require re-heat stages. This greater level of simplicity results in organic Rankine cycles being suited for smaller systems, in which the complex configurations of a large steam plant (e.g. combined cycle plant) may not be cost justified.

FIG. 1 shows the inclusion of a separate ORC apparatus 150 that is configured to receive the exhaust gas outlet from the enclosed space of the HP air heater. Heat from the exhaust gas is exchanged with an organic fluid circulated by a pump through a condenser and a turbine. The energy from the turbine is used to drive a generator to output electricity.

The use of a back-end ORC installation is not required and is an optional feature that can serve to enhance the performance of an already-efficient system. Such enhancement is discussed in connection with certain examples given below.

In order to quantify possible performance of the apparatus according to an embodiment, a model for the proposed air expansion circuit was created. First, certain commercially available gas turbines were characterized in a gas turbine sub-model using publicly available information. The sub-model is a simplified representation of an actual gas turbine, based upon the information available. The parameters of pressure ratio, air mass flow, efficiency and exhaust gas temperature were represented.

In particular, turbine information can be found in sources such as the Gas Turbine World Handbook, manufacturers' websites, or in published papers. Parameters which may typically be found from such sources include electrical power output, compressor pressure ratio, the compressor air flow rate, the heat rate (or thermal efficiency), and the exhaust gas temperature.

The characterization is performed by a computer model of the original gas turbine using published information in combination with informed assumptions concerning some parameters, for which no published data is available. The gas turbine sub-model assumes that the air which is used for cooling of the turbine blades, is mixed in with the main flow just after the first row of moving turbine blades. This reduces the gas temperature for the downstream parts of the turbine.

The model is used to predict the gas turbine performance, adjusting assumptions to obtain the best fit with the available information. The following Table 1 shows the main results of the characterization exercise for sub-models of four single-shaft simple cycle gas turbines. Published data on net electrical power, gas turbine electrical efficiency and gas turbine exit temperature are compared with the values calculated by the gas turbine sub-model, resulting in close agreement.

| GAS TURBINE CHARACTERIZATION | | | | |
|---|---|---|---|---|
| Manufacturer Gas turbine name | Siemens SGT-100 | Kawasaki M7A-03 | Solar Taurus 70 | GE 7FA |
| Published net electrical power (kW) | 5400 | 7830 | 7965 | 215769 |
| Calculated net electrical power (kW) | 5392 | 7842 | 7682 | 215835 |
| Published electrical efficiency (%) | 31.0% | 34.1% | 34.3% | 38.6% |
| Calculated gas turbine efficiency (%) | 31.3% | 34.0% | 34.3% | 38.2% |
| Published turbine exit temperature (° C.) | 531 | 520 | 510 | 599 |
| Calculated turbine exit temperature (° C.) | 533 | 520 | 510 | 599 |

The gas turbine sub-model which was used to characterize the unmodified commercial gas turbine was then incorporated in the model of the overall system shown in FIG. 1. The following Table 2 shows the additional input data to model the circuit incorporating the SGT-100 gas turbine. The first data column shows input data for the maximum air pressure of 200 bar. The second data column shows input data for the minimum air pressure of 40 bar.

| | Max air pressure | Min air pressure |
|---|---|---|
| Gas turbine manufacturer | Siemens | Siemens |
| Gas turbine type | SGT-100 | SGT-100 |
| Maximum air inlet temperature to gas turbine (° C.) | 410.54 | 410.54 |
| Gas turbine air flow rate (kg/s) | 20.235 | 20.235 |
| Compressed air storage exit pressure (bar) | 200 | 40 |
| Pressure ratio of HP air turbine | 2.45 | 1.00 |
| Compressed air storage exit temp (° C.) | 30 | 30 |
| Isothermal compressor efficiency | 85% | 85% |
| HP air heater secondary DP (%) | 1% | 1% |
| LP air heater, secondary DP (%) | 2% | 2% |
| HP and LP air heater minimum DT (° C.) | 20 | 20 |
| HP and LP gas burner efficiency (%) | 99.7% | 99.7% |
| LP burner DP (%) | 3% | 3% |
| HP burner DP (%) | 3% | 3% |
| Inlet temperature of HP air turbine (if not bypassed) (° C.) | 700 | — |
| Inlet air temperature of LP air turbine (° C.) | 700 | 564 |
| LP air heater primary side DP (%) | 3% | 3% |
| HP air heater primary side DP (%) | 3% | 3% |
| Gas LHV calorific value, MJ/m$^3$ (at 1 atm, 15° C.) | 34.82 | 34.82 |
| Gas density (at 1 atm, 15° C.) | 0.723 | 0.723 |
| Stoichiometric ratio of $CO_2$ (by vol) to fuel gas | 1.04 | 1.04 |
| Stoichiometric ratio of $H_2O$ (by vol) to fuel gas | 2.021 | 2.021 |
| Isentropic efficiency of HP air turbine | 87.0% | 87.0% |
| Isentropic efficiency of LP air turbine | 87.0% | 87.0% |
| LP and HP air turbine mechanical & electrical efficiency | 97.0% | 97.0% |
| Atmospheric pressure, bar | 1.01325 | 1.01325 |
| Atmospheric air temperature (° C.) | 15 | 15 |
| Atmospheric humidity | 60% | 60% |

Although the operating conditions of the gas turbine within the system are nearly the same as that of the stand-alone gas turbine, there are some minor differences. In particular, the presence of the heat exchangers (air heaters) downstream of the gas turbine causes a rise in the back-pressure, which reduces the output and raises the gas turbine outlet temperature. Also, there are some conditions under which the temperature of the air entering the gas turbine combustor is reduced below the normal value. This causes a small increase in the amount of fuel required to achieve the design operating temperature. The gas turbine sub-model takes these effects into account.

Table 2 shows the input data for the various parts of the system, including heat exchanger pressure losses, minimum temperature differences in the heat exchangers, and the isentropic efficiencies of the HP and LP turbines. The feature of bypassing the HP air turbine when the air storage pressure drops below 100 bars, is represented in the model by inputting a value of 1.0 for the pressure ratio of the HP turbine.

As shown in Table 2, the same fractional pressure losses have been assumed for low pressure operation of the circuit as for high pressure operation even though there is a possibility of bypassing some elements of the circuit during low pressure operation. It is also seen from Table 2 that when the air source pressure is reduced to 40 bars, the air inlet temperature of the LP air turbine is reduced below the 700° C. figure, which is assumed at 200 bar air source pressure. This avoids too high an air inlet temperature to the gas turbine combustor. When the air source pressure is low, the pressure ratio of the LP air turbine is reduced and so the temperature drop in the LP air turbine is also reduced.

Figure 3:
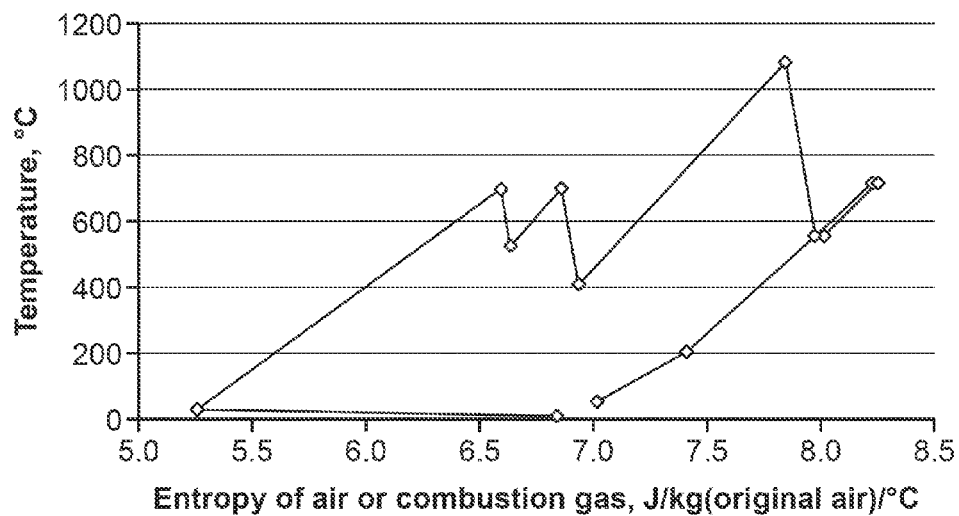
FIG. 3 is a temperature-entropy (T-S) diagram for an SGT-100 gas turbine with 200 bar air source pressure.
Figure 4:
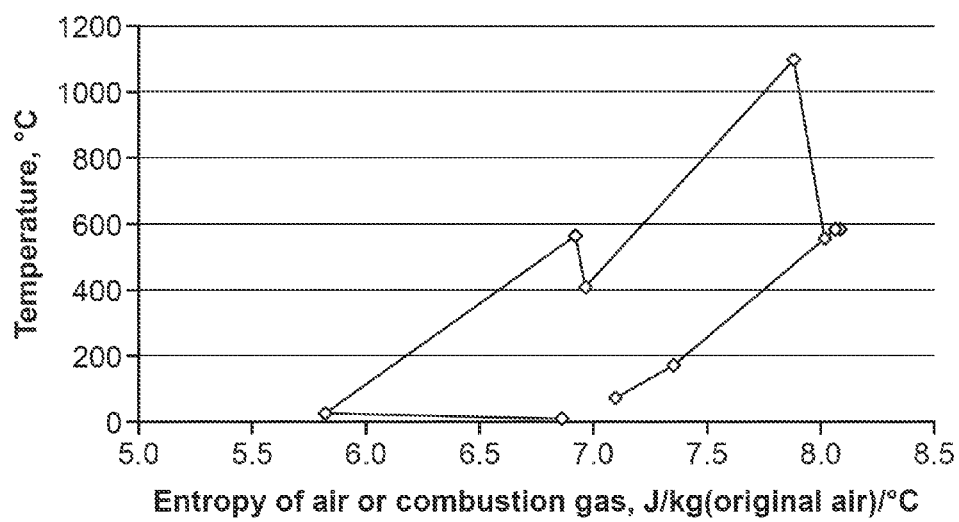
FIG. 4 is a T-S diagram for the SGT-100 gas turbine with 40 bar air source pressure.

FIG. 3 and FIG. 4 are temperature-entropy (T-S) diagrams for the SGT-100 gas turbine at the maximum air source pressure of 200 bar and at the minimum pressure of 40 bar. The figures show the change from two- to one-air turbine expansion, as the air source pressure is reduced.

The model also allows for analysis of the gas turbine and air turbine expansion circuit of FIG. 1, including the performance of the optional organic Rankine cycle. The following Table 3 shows input data used for the calculation with the Siemens SGT-100 gas turbine, both at a maximum air pressure of 200 bar and a minimum air pressure of 40 bar.

| INPUT DATA - Organic Rankine cycle Organic working fluid | Maximum Air Pressure neopentane | Minimum Air Pressure neopentane |
|---|---|---|
| Boiler saturation temp (° C.) | 140.0 | 105.0 |
| Minimum acceptable pinch point temp difference (° C.) | 20.0 | 20.0 |
| Gas side pressure drop in ORC heat exchanger (%) | 3.00% | 3.00% |
| Condenser saturation temperature (° C.) | 25.00 | 25.00 |
| Required exhaust gas dew-point margin (° C.) | 10.00 | 10.00 |
| Turbine isentropic efficiency (%) | 85.0% | 85.0% |
| Turbine generator electrical efficiency (%) | 96.0% | 96.0% |
| Feed pump isentropic efficiency (%) | 80.0% | 80.0% |
| Feed pump motor electrical efficiency (%) | 95.0% | 95.0% |
| Turbine exit pressure (bar) | 1.720 | 1.720 |

The modeling revealed that neopentane served as one possible option for a suitable organic fluid for the gas turbines and the proposed operating conditions. Table 3 indicates that it may be beneficial to reduce the pressure and hence the saturation temperature of the organic fluid, as the storage pressure of the compressed air falls.

Figure 5:
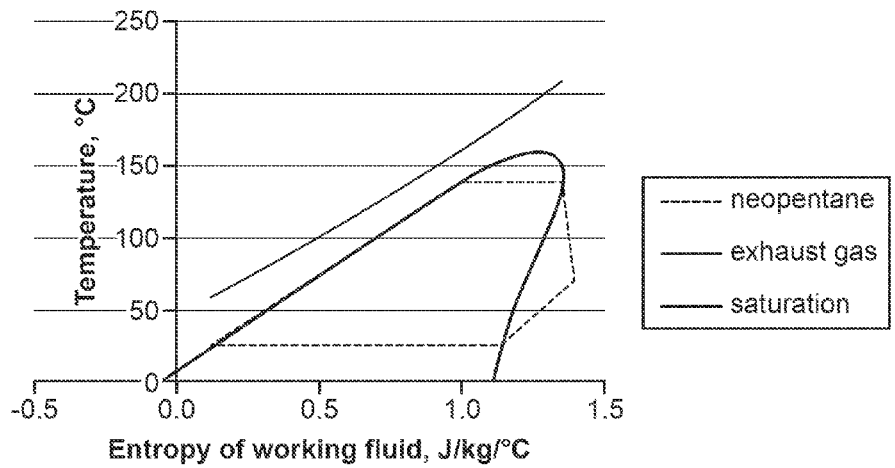
FIG. 5 is a T-S diagram of the optional organic Rankine cycle with an SGT-100 gas turbine and an air source pressure of 200 bar.

FIG. 5 is a T-S diagram of the optional organic Rankine cycle with an SGT-100 gas turbine and an air source pressure of 200 bar. This figure shows good temperature matching on the two sides of the heat exchanger. FIG. 5 also indicates reduction of the final exhaust temperature from over 200° C. down to about 60° C.

Figure 6:
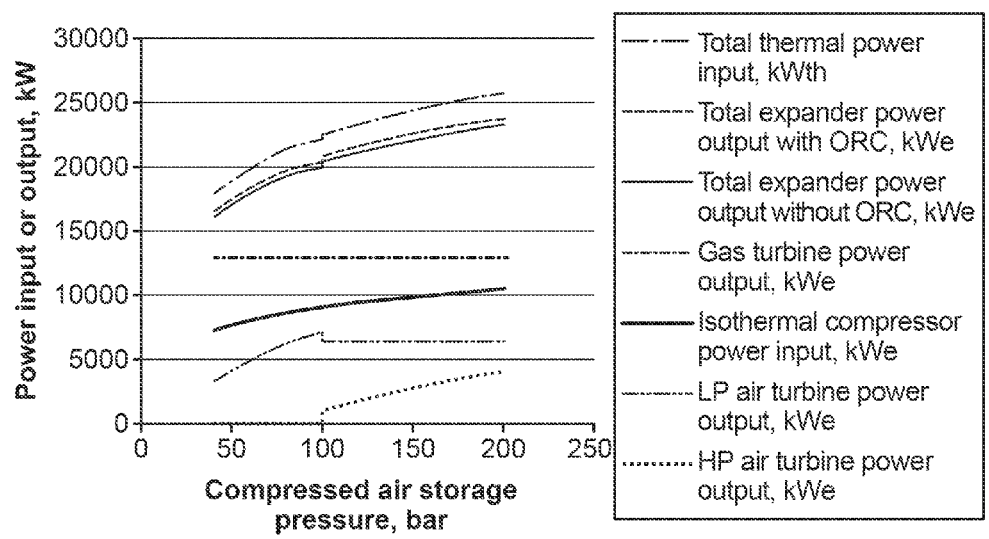
FIG. 6 shows how the various power inputs and outputs vary over the range of air source pressures.

Various performance calculations were made utilizing the model. FIG. 6 shows power inputs and outputs for the SGT-100 gas turbine, over a range of air source pressures.

FIG. 6 shows how the various power inputs and outputs vary over the range of air source pressures. It is seen that the gas turbine power output is relatively constant throughout this range. The power demand of the isothermal compressor increases with the air storage pressure, as a constant compressor efficiency of 85% relative to ideal isothermal compression is assumed.

The LP air turbine output increases over the range from 40-100 bar air source pressure. Then, there is a slight dip and the LP air turbine power output is constant above 100 bar air storage pressure.

The HP air turbine power output reduces from about 4000 kW to about 1000 kW as the air source pressure reduces from 200 bar to 100 bar. Below 100 bar, the HP air turbine is bypassed and therefore produces no power.

FIG. 6 also shows that the total power output is not much less than the total thermal input to the expansion cycle. This indicates a high thermal efficiency of the expansion process.

Figure 7:
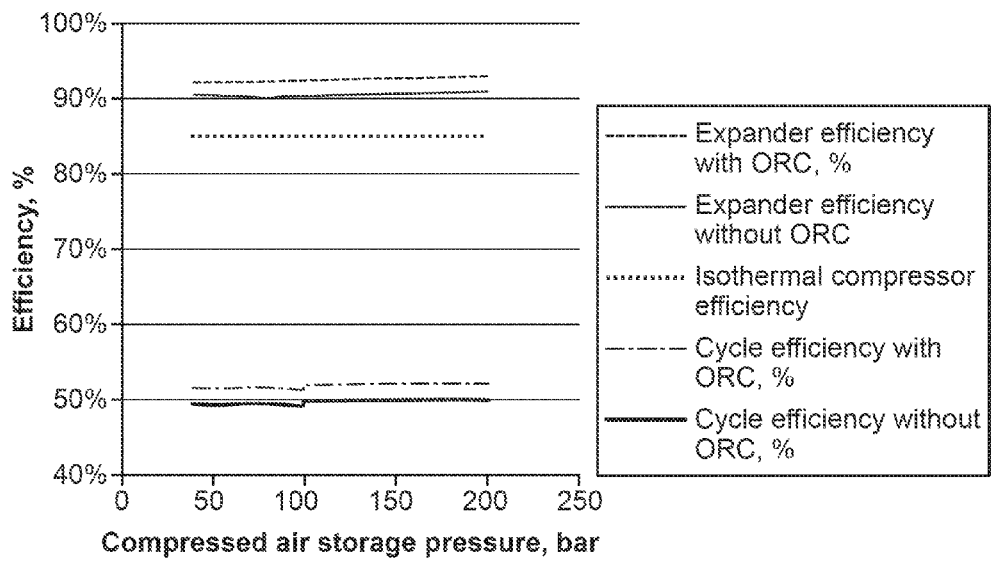
FIG. 7 shows the efficiencies of a system integrating the SGT-100 turbine over the range of air source pressures.

FIG. 7 shows the efficiencies of a system integrating the SGT-100 turbine over the range of air source pressures. The overall cycle efficiency is calculated by subtracting the compression power from the expander power output, and then dividing by the total thermal input.

From FIG. 7 it is seen that the thermal efficiency of the expander system is at or slightly above 90% over the whole range of air source pressures even without the organic Rankine cycle. If an ORC is included, then the expander efficiency is at or slightly above 92% over the whole range. The overall cycle efficiency is close to 50% without the ORC, and is increased by 1.5 to 2% points if the ORC is added.

Modeling of systems integrating the other three gas turbines listed in Table 1, was also performed. Some differences between the different gas turbines resulting from this modeling are now discussed.

Figure 8:
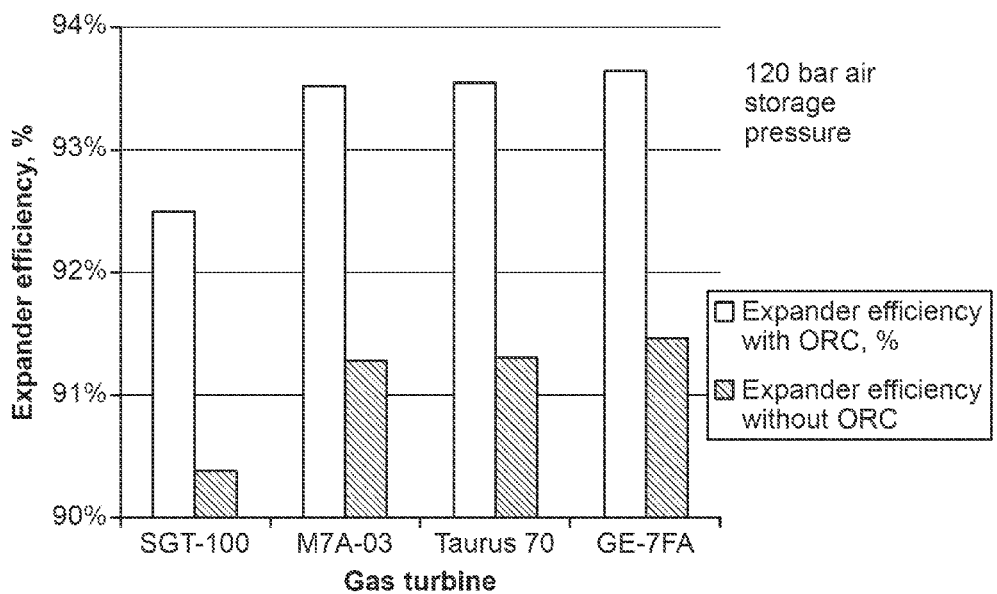
FIG. 8 plots expander efficiency with the four specific gas turbines at 120 bar air source pressure.

FIG. 8 plots expander efficiency with the four specific gas turbines at 120 bar air source pressure. It is seen that the efficiency (with ORC) increases from about 92.5% for the 5 MW SGT-100, to 93.5% for the 8 MW M7A-03 and the Solar Taurus 70. However, little further change in expander efficiency is achieved as the size and power of the gas turbine increases to 216 MW. This is because expander efficiency is already high with the small gas turbines.

Figure 9:
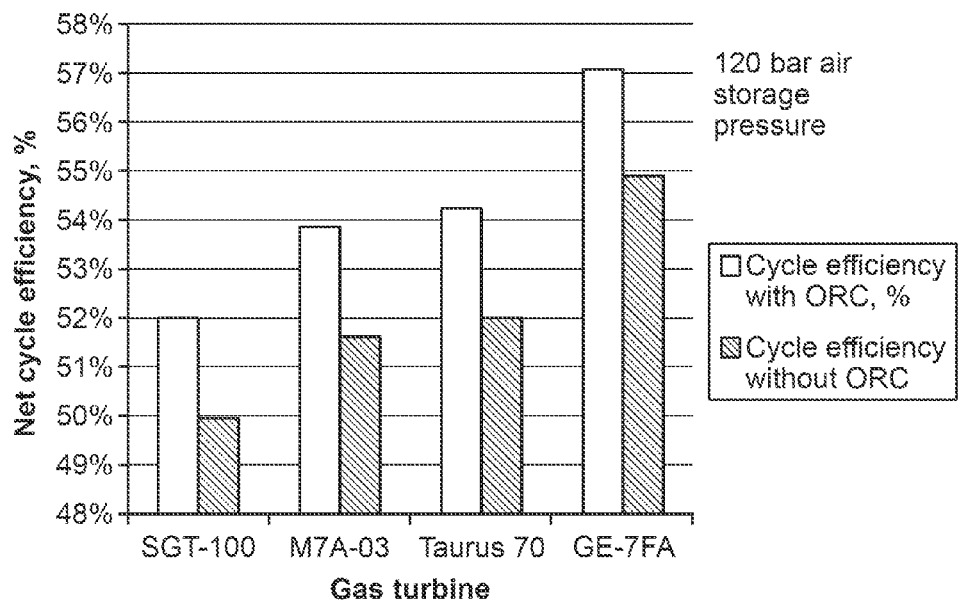
FIG. 9 plots overall cycle efficiency with the four specific gas turbines at 120 bar air storage pressure.

FIG. 9 plots overall cycle efficiency with the four specific gas turbines at 120 bar air storage pressure. In contrast with FIG. 8, this plot of overall cycle efficiency reflects a steady improvement as the size and power of the gas turbine increases. It is seen that the overall cycle efficiency (with ORC) reaches 57% in the case of GE-7FA gas turbine, whose power output per unit of air flow, is significantly improved.

Figure 10:
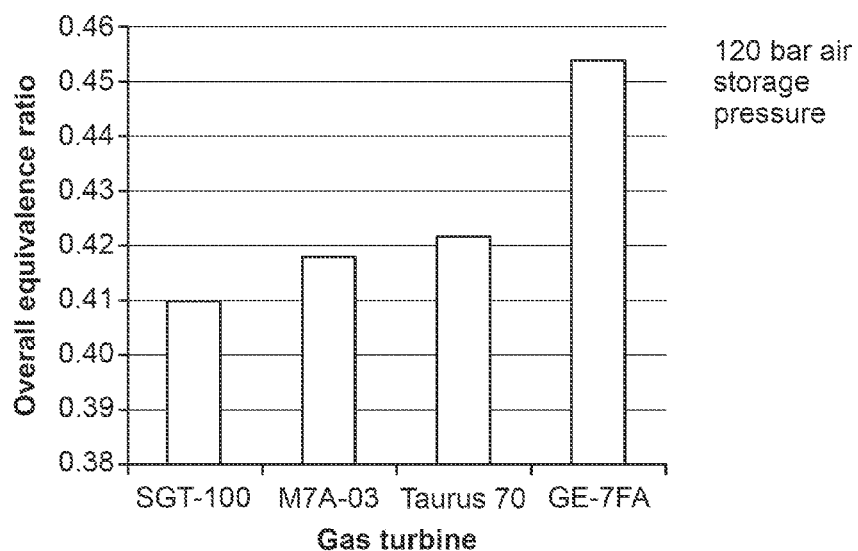
FIG. 10 plots overall equivalence ratio of the expansion system for the four specific gas turbines when the air source pressure is 120 bar.

FIG. 10 plots overall equivalence ratio of the expansion system for the four specific gas turbines when the air source pressure is 120 bar. This equivalence ratio includes the fuel used in the gas turbine and in both HP and LP burners. There is a significant increase as the size and power of the gas turbine increases.

Figure 11:
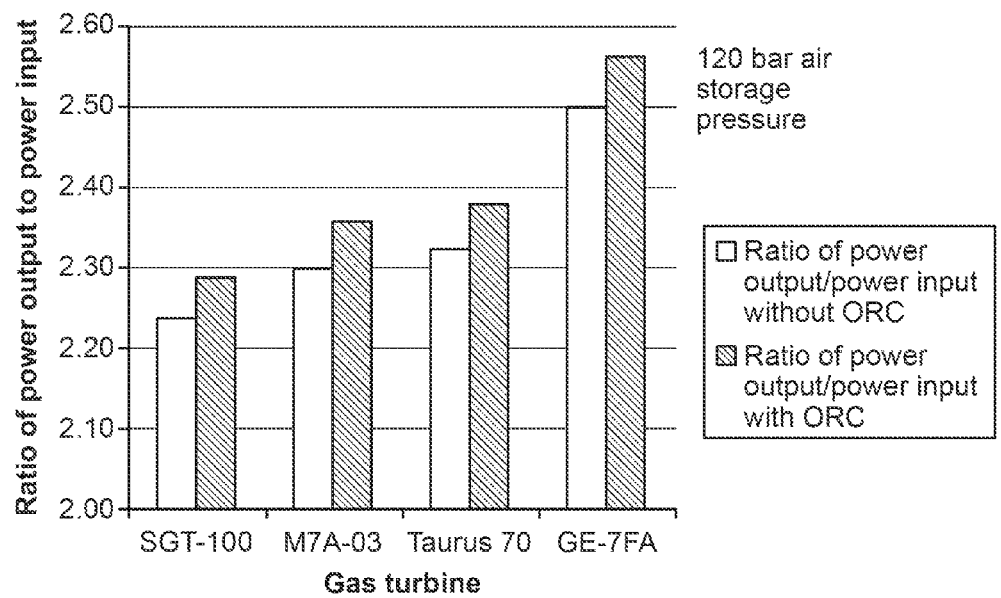
FIG. 11 shows the ratio of electrical power output to input for the four specific gas turbines, both with and without the ORC option.

FIG. 11 shows the ratio of electrical power output to input for the four specific gas turbines, both with and without the ORC option. It is seen that this ratio increases for the larger gas turbines which have higher turbine firing temperatures (i.e. the gas temperature at the inlet to the moving blades of the gas turbine), and higher isentropic efficiencies.

Specifically, FIG. 11 shows that the ratio of power output to power input increases substantially in line with the increase in the equivalence ratio. The increase in power output per unit mass of air indicates that the proportion of the expansion power, which is required for compression, is reduced. Therefore the overall cycle efficiency improves, even though there is little increase in the expansion efficiency.

The increase in equivalence ratio is not necessarily related to the size of the gas turbine, since some relevant factors are the gas turbine firing temperature and the isentropic efficiency of the gas turbine expansion. For example, the gas turbine firing temperature is determined by the blade material and by the blade cooling technology, rather than the physical size of the gas turbine. It is noted that the assumed turbine firing temperature of the GE-7FA is about 1300° C. compared to temperatures of 1100 to 1160° C. for the smaller gas turbines.

A high isentropic efficiency may also influence the equivalence ratio since this gives a larger temperature drop for a given pressure ratio. Consequently more fuel can be added in the downstream duct burners. Larger gas turbines tend to achieve higher isentropic efficiencies partly because leakage and other turbine blade end effects are smaller in proportion to the total power output.

The effects of operational conditions on gas turbine and air turbines were also modeled. As previously mentioned, the increase in turbine back pressure due to the downstream heat exchangers causes the gas turbine exhaust temperature to be raised slightly above the standard operating conditions in a simple cycle configuration. This effect is also observed with gas turbines in a conventional gas and steam combined cycle.

Figure 12:
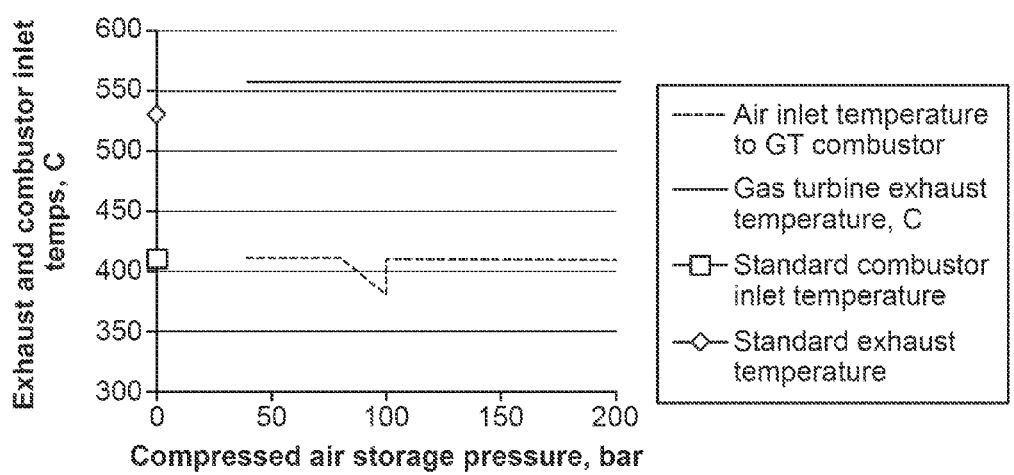
FIG. 12 shows exhaust and combustor inlet conditions for the SGT-100 turbine.

FIG. 12 shows exhaust and combustor inlet conditions for the SGT-100 turbine. FIG. 12 shows that the gas turbine exhaust temperature is increased by about 25° C. It is also seen that the temperature of the air supplied to the gas turbine combustor (and to the blade cooling system) is the same as the standard combustor inlet temperature over nearly all the air source pressure range.

There is, however, a small reduction in this inlet temperature in the pressure range between 80 bar and 100 bar air source pressure. This reduction arises because the HP air turbine is bypassed below 100 bar, so the LP air turbine has a high pressure ratio.

The air inlet temperature to the air turbine is limited to 700° C., so the high pressure ratio causes a reduction in the air temperature leaving the LP air turbine. It is not expected that significant issues would arise from this small reduction in the combustor air inlet temperature.

Figure 13:
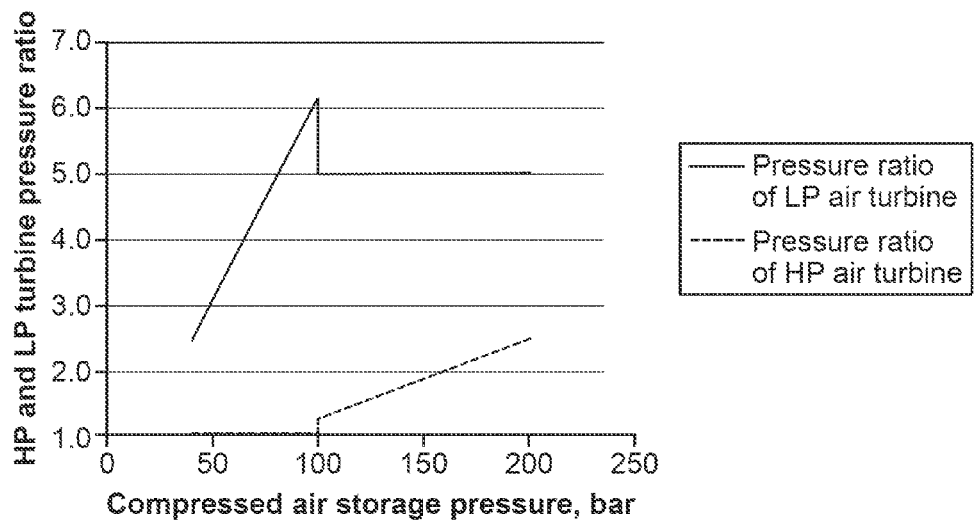
FIG. 13 shows the variation in pressure ratios of HP and LP air turbines with air source pressure of the compressed air source for the case of the SGT-100 gas turbine.

FIG. 13 shows the variation in pressure ratios of HP and LP air turbines with air source pressure of the compressed air source for the case of the SGT-100 gas turbine.

Figure 14:
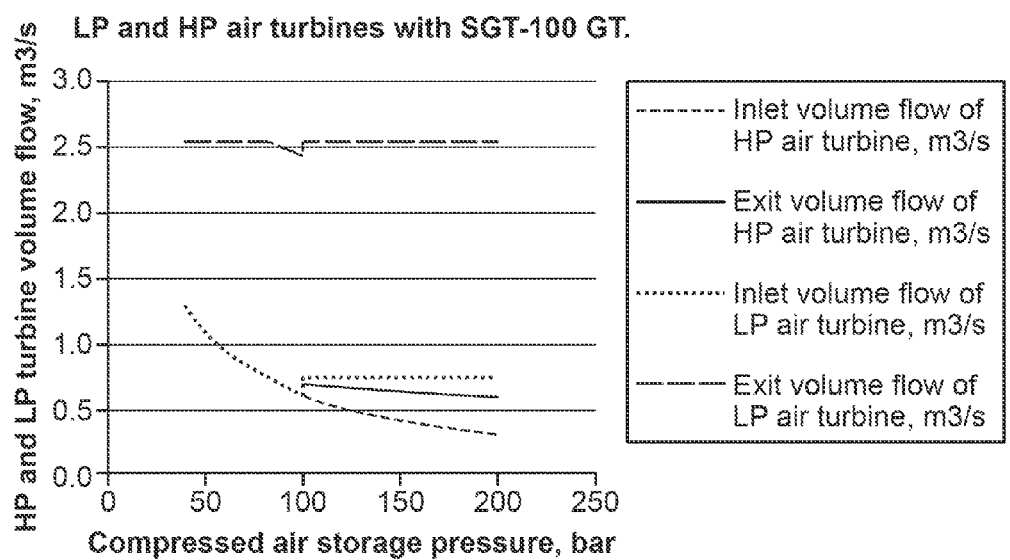
FIG. 14 shows the variation in inlet and exit volume flows through the LP and HP turbines.

FIG. 14 shows the variation in inlet and exit volume flows through the LP and HP turbines. The exit volume flow of the LP air turbine is almost constant, since this matches the inlet volume flow to the gas turbine.

Overall performance of the proposed power cycle may be compared with that of a conventional combined cycle gas turbine (CCGT) having a steam Rankine cycle. The performance of CCGTs is dependent on the size of the plant. This is partly because large gas turbines are more efficient than small ones.

The dependence of CCGT performance on size is also a consequence of the fact that the efficiency of a steam Rankine cycle is dependent on its complexity. In particular, the efficiency of a steam plant used for gas turbine heat recovery is increased if it has three boiler pressures, and if the steam is reheated after expansion in the HP steam turbine. The increased complexity of the steam cycle can only be justified for large plants.

Figure 15:
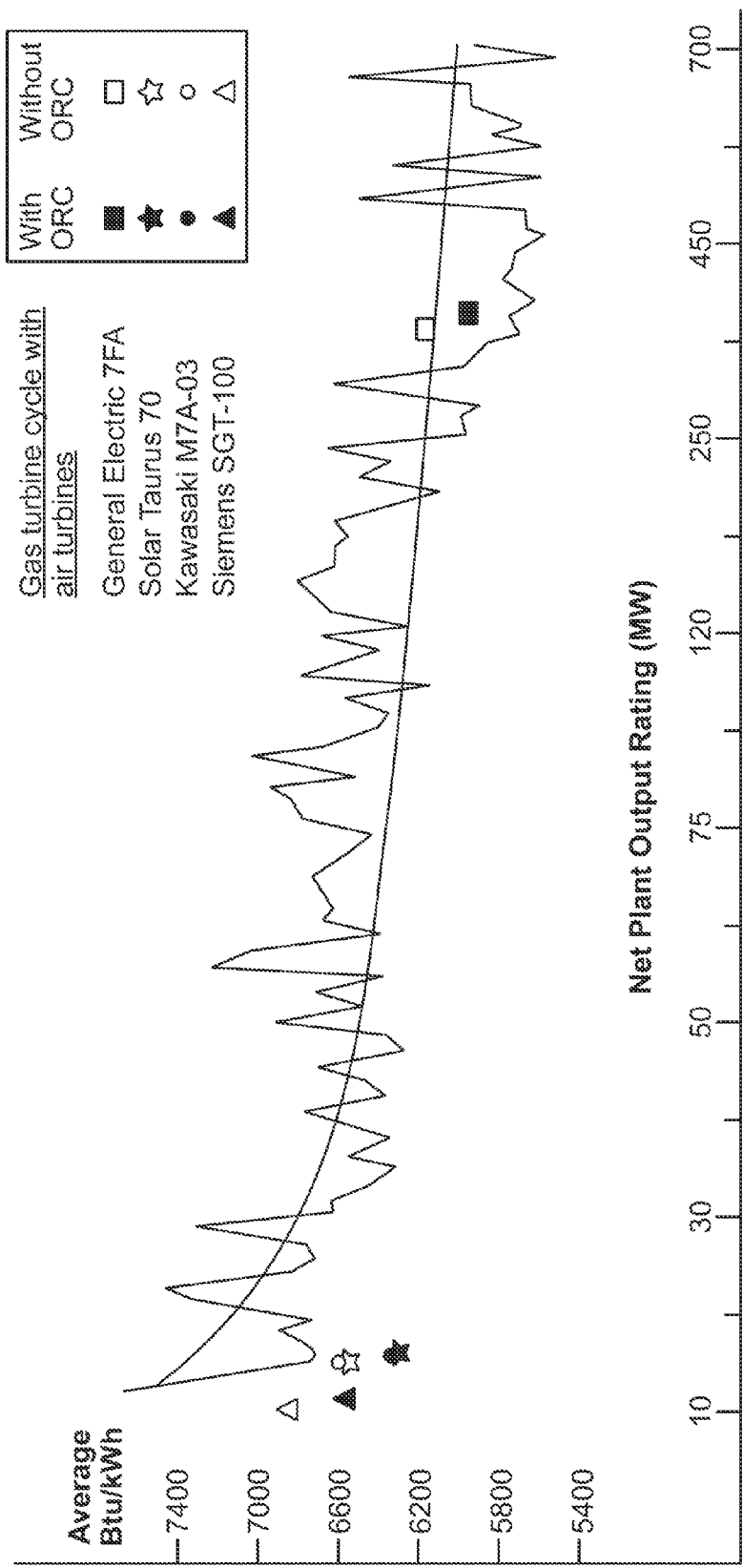
FIG. 15 shows a graph of heat rates (in Btu/kWh) of a combined cycle gas turbine plant, versus the rated plant output.

FIG. 15 shows a graph of heat rates (in Btu/kWh) of a combined cycle gas turbine plant, versus the rated plant output. Modeled heat rates of the proposed gas turbine and air turbine plants are also superimposed on the graph. These heat rates refer to the complete cycle including the compression.

FIG. 15 shows the heat rate for the complete cycle involving the General Electric 7FA gas turbine is comparable with corresponding combined cycle gas turbines of similar output. However, the heat rates for cycles involving the three smaller gas turbines are all significantly lower than for the corresponding size of combined cycle systems.

Particular embodiments of the proposed power cycle may be employed to store cheap off-peak energy, which may be provided by renewable energy sources, such as wind. On the other hand, the power obtained from expansion is delivered at such times when the electricity demand is high and power prices are also high.

Thus, if renewable sources are used to provide the off-peak power, then the high expansion efficiency of over 90% allows substantial reduction in the production of carbon-dioxide per kWh as compared to the most efficient combined cycle plants, which in general have an efficiency of about 60%

What is claimed is:

1. An apparatus configured to adapt a combustion gas turbine to operate using input compressed air received from a compressed air storage unit, the apparatus comprising:
    the combustion gas turbine of single shaft design and configured to receive heated compressed air at a predetermined temperature and pressure, the combustion gas turbine configured to output a first combustion product of the heated compressed air;
    a burner configured to output a second combustion product resulting from ignition of fuel in the first combustion product;
    a compressed air heater configured to perform heat exchange between the second combustion product and compressed air from a high pressure source to produce the heated compressed air, the compressed air heater maintaining the heated compressed air separate from the second combustion product; and
    a first air turbine configured to be driven by expansion of the heated compressed air received from the compressed air heater, the first air turbine further configured to flow expanded air to the combustion gas turbine as the heated compressed air,
    wherein the combustion gas turbine comprises an existing gas turbine that has been modified to avoid a compressor element by removing compressor blades.

2. An apparatus as in claim 1 wherein the burner comprises a duct burner.

3. An apparatus as in claim 1 further comprising a turbine configured to be driven by an organic fluid heated by the second combustion product according to an organic Rankine cycle (ORC).

4. An apparatus as in claim 1 wherein the high pressure source comprises the compressed air storage unit.

5. An apparatus as in claim 4 wherein the compressed air storage unit is configured to receive compressed air from a substantially isothermal air compressor.

6. An apparatus as in claim 1 wherein the high pressure source comprises an air compressor.

7. An apparatus as in claim 6 wherein the air compressor is configured to perform substantially isothermal compression.

8. An apparatus as in claim 6 wherein the air compressor is configured to compress inlet air utilizing heat exchange across a gas/liquid interface.

9. An apparatus as in claim 1 wherein the air heater is configured to heat the compressed air to about 700° C.

10. An apparatus as in claim 1 wherein the gas turbine is connected to a first electrical generator, and the first turbine is connected to a second electrical generator.

11. An apparatus as in claim 6 wherein the air compressor comprises multiple stages.

12. An apparatus as in claim 5 wherein the substantially isothermal air compressor is configured to compress inlet air utilizing heat exchange across a gas/liquid interface.

* * * * *